US012373840B2

(12) United States Patent
Hegde et al.

(10) Patent No.: US 12,373,840 B2
(45) Date of Patent: Jul. 29, 2025

(54) ARTIFICIAL INTELLIGENCE MODELING FOR MODEL ROUTING WITHOUT INFERENCE ENGINES

(71) Applicant: Stripe, Inc., San Francisco, CA (US)

(72) Inventors: Chiranth Manjunath Hegde, Seattle, WA (US); Vinayak Thapliyal, Seattle, WA (US)

(73) Assignee: Stripe, Inc., San Francisco, CA (US)

( * ) Notice: Subject to any disclaimer, the term of this patent is extended or adjusted under 35 U.S.C. 154(b) by 186 days.

(21) Appl. No.: 18/341,559

(22) Filed: Jun. 26, 2023

(65) Prior Publication Data
US 2024/0428252 A1 Dec. 26, 2024

(51) Int. Cl.
G06Q 20/40 (2012.01)

(52) U.S. Cl.
CPC .............. G06Q 20/4016 (2013.01)

(58) Field of Classification Search
None
See application file for complete search history.

(56) References Cited

U.S. PATENT DOCUMENTS

| | | | |
|---|---|---|---|
| 11,288,673 B1 * | 3/2022 | Venturelli | G06F 18/214 |
| 11,961,084 B1 * | 4/2024 | Lauz | G06Q 20/4016 |
| 2017/0148027 A1 * | 5/2017 | Yu | G06Q 10/0635 |
| 2018/0350006 A1 * | 12/2018 | Agrawal | G06F 7/08 |
| 2020/0234305 A1 * | 7/2020 | Knutsson | G06N 20/00 |
| 2023/0177512 A1 * | 6/2023 | Laptiev | G06Q 20/4016 705/44 |
| 2023/0230090 A1 * | 7/2023 | Manapat | G06Q 20/405 705/44 |
| 2024/0144275 A1 * | 5/2024 | Ammatanda | G06N 5/01 |
| 2024/0177164 A1 * | 5/2024 | Pandey | G06Q 20/407 |

* cited by examiner

Primary Examiner — David P Sharvin
(74) Attorney, Agent, or Firm — Foley & Lardner LLP

(57) ABSTRACT

One method includes identifying a set of fraud-detection ML models to be used to determine a fraud status of a transaction; executing a routing ML model configured to generate a score for at least a subset of the set of fraud-detection ML models, based on an input of an amount and an attribute associated with the transaction, the score indicative of the fraud status for the transaction based on the amount and the attribute; executing using the amount and the attribute associated with the transaction, a subset of the set of fraud-detection ML models selected in accordance with each fraud-detection ML model's respective score, whereby at least one fraud-detection ML model within the subset of the set of fraud-detection models generates a prediction associated with the fraud status of the transaction; and authorizing the transaction based on the prediction.

20 Claims, 6 Drawing Sheets

```
                                                          200
```

```
┌─────────────────────────────────────────────────────────────┐
│ Receive a request to determine a fraud status associated   │
│ with a transaction, the request further identifying a set  │
│ of fraud-detection models to be used to determine the      │
│ fraud status. 210                                          │
└─────────────────────────────────────────────────────────────┘
                              ↓

┌─────────────────────────────────────────────────────────────┐
│ Execute a routing machine learning model to predict a      │
│ score for at least a subset of the set of fraud-detection  │
│ machine learning models, the score indicative of a         │
│ likelihood of detection of a fraud status for the          │
│ transaction in accordance with the amount of the           │
│ transaction and the attribute of the product or service    │
│ associated with the transaction. 220                       │
└─────────────────────────────────────────────────────────────┘
                              ↓

┌─────────────────────────────────────────────────────────────┐
│ Execute, using the amount of the transaction and the       │
│ attribute of a product or service associated with the      │
│ transaction, a subset of the set of fraud detection models │
│ selected in accordance with each fraud detection model's   │
│ respective score. 230                                      │
└─────────────────────────────────────────────────────────────┘
                              ↓

┌─────────────────────────────────────────────────────────────┐
│                                                             │
│            Authorize the transaction. 240                   │
│                                                             │
└─────────────────────────────────────────────────────────────┘
```

FIG. 2

| Sub-Model | Recall Impact | Merchant with Positive Impact | Merchants with Negative Impact | AUC Impact |
|---|---|---|---|---|
| Software | +35.69 | Merchant A | Merchant E | +70.03 |
| Food & Drink | +187.51 | Merchant B | Merchant F | +102.70 |
| Merchandise | -25.27 | Merchant C | Merchant G | +119.37 |
| Clothing | -39.31 | Merchant D | Merchant H | +100.54 |

FIG. 4

| Sub-Model | Recall σ | AUC σ | SR Standardized Mean Difference | AUC Standardized Mean Difference |
|---|---|---|---|---|
| Food & Drink | 22.4 | 3.91 | 8.35 | 17.87 |
| Merchandise | 44.14 | 6.63 | -0.57 | 28.26 |

FIG. 5

ARTIFICIAL INTELLIGENCE MODELING FOR MODEL ROUTING WITHOUT INFERENCE ENGINES

TECHNICAL FIELD

This application relates generally to generating, training, and operating computer models to route electronic requests to other computer models suitable to satisfy the requests.

BACKGROUND

With the advent of advanced computer modeling techniques, the use of computer models to rapidly analyze data has become ubiquitous. Moreover, advanced analytical protocols have allowed unique computer models to analyze various aspects of the same data. For instance, in digital payment systems where electronic transactions occur at a rapid pace, one or more computer models are used to verify/authorize transactions. These models can detect possible fraud and/or other issues related to transactions, payment cards, merchants, and/or customers.

However, the advent of these sophisticated models has also created some technical problems. For instance, selecting the most suitable computer model is a technical problem that requires careful consideration and expertise. Most electronic payment systems include a wide array of computer models available, each with its own unique features, capabilities, and limitations. Determining which subset of computer models to execute presents a complex decision-making process. In time-sensitive situations, such as transaction authorization, the selection of a proper group of computer models is of additional importance. Conventional methods/systems of model routing have not produced satisfactory results because they typically use static thresholds or other binary analyses.

SUMMARY

For the aforementioned reasons, there is a desire for methods and systems to provide rapid and efficient analysis of pertinent characteristics of a request in order to identify a suitable computer model to satisfy a request. What is also desired are methods and systems for efficient routing of data needing analysis to one or more suitable computer models, such as a processor (or a computer model) that can receive a request (e.g., a request to verify a transaction), identify one or more suitable computer models, route the request to the identified computer models, and display or otherwise output the results.

Disclosed herein are methods and systems for an intelligent request routing system/method that uses various methods and systems, such as algorithmic methods and machine-learning models, to identify one or more suitable computer models configured to satisfy the request by verifying pertinent the electronic content (e.g., transaction data).

Using the methods and systems discussed herein, a processor (e.g., analytics server) may use transfer learning for machine-learning customization at the segment level with improvements in various metrics, such as recall (e.g., or any other variations of recall, such as recall with low false positive rates) for various models and/or segments of the models (e.g., sub-models). Therefore, when the methods and systems discussed herein are implemented, improvements in the recall at the user level (e.g., merchant level) can be achieved. Therefore, using the transfer learning as a method of machine-learning customization that create efficiencies.

Using the methods and systems discussed herein, a routing machine-learning model can identify at least one suitable computer model by evaluating its various technical characteristics, such as computational power, memory capacity, processing speed, graphics capabilities, and compatibility with the desired software or applications. Additionally, considerations like the intended use of the computer model, budget constraints, scalability requirements, and future-proofing of the technology can be taken into account.

The routing machine-learning model described herein that can route a request to a suitable model or sub-model within a serialization process instead of doing it in an inference engine. As a result, a global machine-learning model can be adapted to pre-defined segments or sub-models to improve performance for that segment. Using the routing machine-learning model discussed herein, a large number of sub-models can be created where the routing machine-learning model can adapt itself to each sub-models specific characteristics.

In an embodiment, a method comprises identifying, by a processor, a set of fraud-detection models to be used to determine a fraud status of a transaction; executing, by the processor, a routing machine-learning model configured to generate a score for at least a subset of the set of fraud-detection models, based on an input of an amount and an attribute associated with the transaction, the score indicative of the fraud status for the transaction based on the amount and the attribute, wherein the routing machine-learning model has been previously trained using a training dataset comprising prior fraud status detection data for each fraud-detection machine-learning model; executing, by the processor using the amount and the attribute associated with the transaction, a subset of the set of fraud-detection models selected in accordance with each fraud-detection model's respective score, whereby at least one fraud-detection model within the subset of the set of fraud-detection models generates a prediction associated with the fraud status of the transaction; and authorizing, by the processor, the transaction based on the prediction.

In another embodiment, a non-transitory machine-readable storage medium comprises computer-executable instructions stored thereon that, when executed by one or more processors, cause the one or more processors to perform operations comprising: identify a set of fraud-detection models to be used to determine a fraud status of a transaction; execute a routing machine-learning model configured to generate a score for at least a subset of the set of fraud-detection models, based on an input of an amount and an attribute associated with the transaction, the score indicative of the fraud status for the transaction based on the amount and the attribute, wherein the routing machine-learning model has been previously trained using a training dataset comprising prior fraud status detection data for each fraud-detection machine-learning model; execute, using the amount and the attribute associated with the transaction, a subset of the set of fraud-detection models selected in accordance with each fraud-detection model's respective score, whereby at least one fraud-detection model within the subset of the set of fraud-detection models generates a prediction associated with the fraud status of the transaction; and authorize the transaction based on the prediction.

In another embodiment, a system comprises a processor configured to identify a set of fraud-detection models to be used to determine a fraud status of a transaction; execute a routing machine-learning model configured to generate a score for at least a subset of the set of fraud-detection models, based on an input of an amount and an attribute associated with the transaction, the score indicative of the fraud status for the transaction based on the amount and the attribute, wherein the routing machine-learning model has been previously trained using a training dataset comprising prior fraud status detection data for each fraud-detection machine-learning model; execute, using the amount and the attribute associated with the transaction, a subset of the set of fraud-detection models selected in accordance with each fraud-detection model's respective score, whereby at least one fraud-detection model within the subset of the set of fraud-detection models generates a prediction associated with the fraud status of the transaction; and authorize the transaction based on the prediction.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIG. 2 illustrates a flow diagram of a process executed in an intelligent computer model routing system, according to an embodiment.

FIGS. 4-7 illustrate non-limiting examples of execution of an intelligent data verification platform, according to an embodiment.

DETAILED DESCRIPTION

Figure 1:
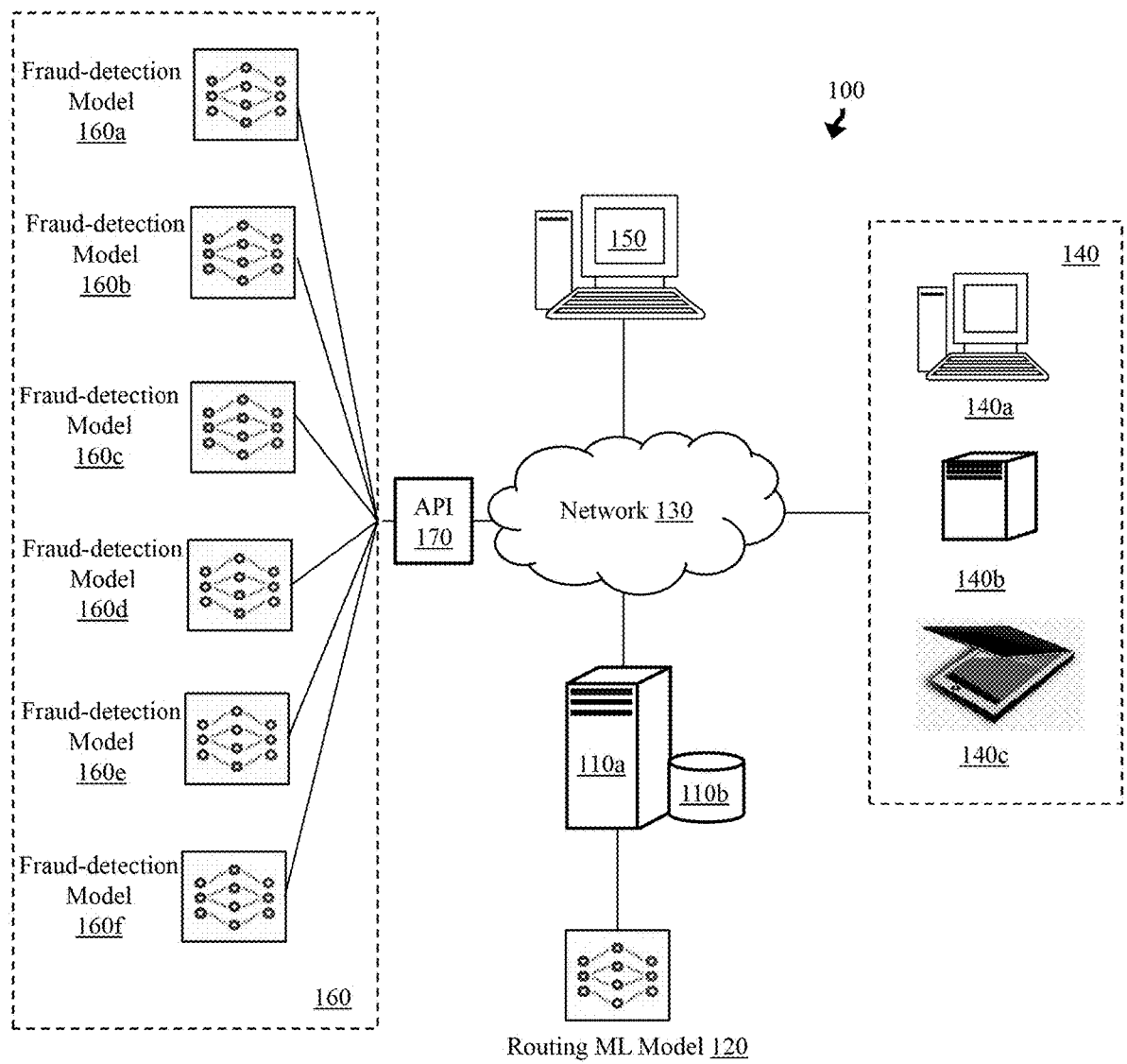
FIG. 1 illustrates various components of an intelligent computer model routing system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a non-limiting example of components of an intelligent computer model routing system (system 100) in which an analytics server 110a operates. The analytics server 110a may utilize features described in FIG. 1 to retrieve/analyze data and route a request to one or more of the fraud-detection models discussed herein. The analytics server 110a may be communicatively coupled to a system database 110b, user devices 140a-c (collectively user devices 140), and an administrator computing device 150. The analytics server 110a may also use various computer models (e.g., fraud-detection computer models 160a-f) to analyze the data.

The system 100 is not confined to the components described herein and may include additional or other components not shown for brevity, which are to be considered within the scope of the embodiments described herein. The system 100 may also include the routing machine-learning model 120, which is a computer model that uses various machine-learning techniques to identify a suitable fraud-detection model 160 based on a request received (e.g., from a processor and/or the user devices 140).

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110a may be configured to receive requests to verify data (e.g., authorize transactions) and output the results, e.g., on the administrator computing device 150. The analytics server may also be configured to route the request to one or more fraud-detection computer models among the fraud-detection computer models 160. The analytics server 110 may receive the request directly from a user result or from another processor (not shown) associated with an electronic payment system. In some embodiments, a user (e.g., a merchant) and/or a system administrator (operating the administrator computing device 150) may use a platform (hosted by the analytics server 110 or a third party) to transmit the request to the analytics server 110. The platform may include one or more graphical user interfaces (GUIs) displayed on the user device 140 and/or the administrator computing device 150.

An example of the platform generated and hosted by the analytics server 110a may be a web-based application or a website configured to be displayed on various electronic devices, such as mobile devices, tablets, personal computers, and the like. The platform may include various input elements configured to receive a request and data to be verified. For instance, a user may access the platform to upload a file or a document to be verified. Using the platform, the user may select the transaction to be verified/authorized and/or select one or more fraud-detection models to be used. In some embodiments, the user may instruct the analytics server 110 to use fraud-detection models that can detect fraud for a particular type of transaction.

The analytics server 110a may be any computing device comprising a processor and non-transitory, machine-readable storage capable of executing the various tasks and processes described herein. The analytics server 110a may employ various processors such as a central processing unit (CPU) and graphics processing unit (GPU), among others. Non-limiting examples of such computing devices may include workstation computers, laptop computers, server computers, and the like. While the system 100 includes a single analytics server 110a, the analytics server 110a may include any number of computing devices operating in a distributed computing environment, such as a cloud environment.

The analytics server 110*a* may utilize one or more application programming interfaces (APIs) 170 to communicate with one or more of the electronic devices described herein. For instance, the analytics server may utilize APIs 170 to automatically transmit/receive data to/from the fraud-detection models 160.

The fraud-detection models 160 may represent a collection of various computer models that algorithmic and/or artificial intelligence modeling techniques to verify data associated with different transactions. In some embodiments, different fraud-detection models may be configured to identify fraud using different methods and/or may be trained differently. For instance, the fraud-detection model 160*b* may be trained and calibrated to identify fraud among transactions in Latin America; the fraud-detection model 160*d* may be calibrated to identify fraud for services rendered; and the fraud-detection model 160*f* may be calibrated to identify fraud in merchandise sales. Therefore, the fraud-detection models 160 may be a collection of different models with different operational parameters.

In some embodiments, a group of the fraud-detection models may belong to a same model. That is, in some embodiments, a single model may include various sub-models. Segmenting a single machine-learning model into different sub-models can be a powerful approach to tackle complex tasks, such as detecting potentially fraudulent transactions.

In some embodiments, a single computer model may be partitioned based on specific feature subsets. By identifying various aspects or characteristics of the input data, sub-models can be trained to specialize in each subset. For example, one sub-model may focus on detecting fraud among card-present transactions, while another sub-model may concentrate on recognizing merchant fraud. Each sub-model may operate independently on its designated feature subset, allowing for parallel processing and efficient utilization of computational resources. In some embodiments, the analytic server 110 may execute multiple sub-models. It is understood that the present disclosure can apply to models or sub-models or models. As described herein, the analytics server 110*a* may use various methods to identify at least one suitable fraud-detection model to verify data needed to authorize a transaction.

User devices 140 may be any computing device comprising a processor and a non-transitory, machine-readable storage medium capable of performing the various tasks and processes described herein. Non-limiting examples of a user device 140 are a workstation computer, laptop computer, phone, tablet computer, and server computer. During operation, various users may use user devices 140 to conduct a transaction. Even though referred to herein as "user" devices, these devices may be operated by any party associated with a transaction (that is being verified by the fraud-detection models 160). For instance, a tablet 140*c* may be used by a merchant (or another person on behalf of a merchant), a loan applicant, a customer, or the like. In another example, the user devices 140 may include a point-of-sale terminal or a card reader.

The administrator computing device 150 may represent a computing device operated by a system administrator. The administrator computing device 150 may be configured to monitor various attributes generated by the analytics server 110*a* (e.g., a suitable service provider or various analytic metrics determined during training of one or more machine-learning models and/or systems); monitor one or more fraud-detection models 160 utilized by the analytics server 110*a* and/or user devices 140; review feedback; and/or facilitate training or retraining (calibration) of the routing machine-learning models 120 that are maintained by the analytics server 110*a*.

In operation, the analytics server 110*a* may receive a request to verify a transaction conducted using a credit card inputted into a point-of-sale system of a merchant. The analytics server 110*a* may first retrieve transaction data from the server 140*b* (a server associated with the merchant). Using the methods discussed herein, the analytics server 110*a* may execute the routing machine-learning model 120 and generates a score indicating the suitability of each fraud-detection model 160*a*-160*f*. After selecting the suitable one or more fraud-detection models, the analytics server 110*a* may transmit the request (along with all the transaction data) to the fraud-detection models 160*b* and 160*d* where the selected models determine that the transaction is fraudulent. As a result, the analytics server rejects the transaction.

FIG. 2 illustrates a flow diagram of a process executed in an intelligent computer model routing system, according to an embodiment. The method 200 includes steps 210-240. However, other embodiments may include additional or alternative execution steps, or may omit one or more steps altogether. The method 200 is described as being executed by a server, similar to the analytics server described in FIG. 1. However, one or more steps of method 200 may also be executed by any number of computing devices operating in the distributed computing system described in FIG. 1. For instance, one or more computing devices (e.g., user devices) may locally perform some or all of the steps described in FIG. 2.

Using the methods and systems described herein, such as the method 200, the analytics server may train a routing machine-learning model, such that the machine-learning model is configured to identify and transmit a request (e.g., data associated with a transaction to be verified) to one or more suitable fraud-detection models. That is, the routing machine-learning model may be a machine-learning model that can work in conjunction with a set of computer models (e.g., fraud-detection models), such that a suitable computer model is automatically predicted for a particular request in accordance with the request's characteristics. The routing machine-learning model may then transmit the request (and the data associated with the request) to the identified computer model. Using the results produced/predicted by the selected fraud-detection models, the analytics server may determine whether to authorize or reject the transaction.

At step 210, the analytics server may receive, from a computing device, a request to determine a fraud status of a transaction. The analytics server may display a platform configured to receive various requests and corresponding data to be verified. The request may be generated and/or transmitted to the analytics server by another processor and/or directly by a user. For instance, a merchant may transmit a request instructing the analytics server to verify a transaction and determine its fraud status.

In some embodiments, a processor associated with an electronic payment system may automatically determine that a transaction is identified as potentially fraudulent and needs to be verified via one or more fraud-detection models. Therefore, the processor may transmit data associated with the transaction to the analytics server along with a request to verify (e.g., authorize) the transaction. Additionally or alternatively, a user (e.g., merchant) may access a platform (e.g., by accessing a website hosted or otherwise associated with the analytics server). The user may then transmit a request to the analytics server to verify a transaction.

The request may include one or more attributes of the transaction needing to be verified, how the data needs to be verified, an indication of the data itself, and the like. In one example, the request may include (e.g., data inputted by the user using various input elements of the platform) an indication of the data to be verified (e.g., the number of a credit card used in a transaction) and an indication of what is to be verified (e.g., the transaction, merchant, and/or the customer).

The request may also include or identify a set of fraud-detection models to be used to satisfy the request. In some embodiments, certain fraud-detection models may be designated as the preferred or flagship models for certain processes. For instance, a processor associated with merchants in Brazil may include a request for a set of fraud-detection models trained using Brazilian training data or otherwise calibrated to evaluate Brazilian transactions. In another example, a request may identify a set of fraud-detection models that are calibrated for a particular merchant's attribute (e.g., sales level, geographical location, or membership level) or calibrated for a particular transaction (e.g., grocery products or home improvement merchandise).

In a non-limiting example, the request may be received from a processor associated with a point-of-sale terminal. For instance, in response to the merchant presenting the terminal to a customer, the customer may swipe their credit card using the terminal. A processor associated with the terminal (or otherwise associated with the payment system supporting the terminal) may then determine (using a variety of methods) that the transaction is likely fraudulent. As a result, the processor generates a data packet that includes the transaction data (e.g., merchant information, customer information, credit card information, data associated with the products being purchased, time of transaction, and other pertinent data). The processor may then transmit the data packet to the analytics server along with instructions to verify/authorize the transaction. In some embodiments, the processor may also identify one or more fraud-detection computer models to be used to authorize the transaction.

At step 220, the analytics server may execute a routing machine-learning model to predict a score for at least a subset of the set of fraud-detection models, the score indicative of a likelihood of detection of a fraud status for the transaction in accordance with the amount of the transaction and the attribute of the product or service associated with the transaction.

The routing machine-learning model may first use a collection of algorithms including, but not limited to, machine-learning algorithms, to determine whether the data (associated with a request) to be verified should be transmitted to one or more fraud-detection computer models. That is, the routing machine-learning model may perform a preliminary check and determine if the request itself can be processed.

Accordingly, the routing machine-learning model may analyze the data to be verified and determine the likelihood of success of the data being verified by one or more fraud-detection models. For instance, the routing machine-learning model may first review data associated with the request and the data, itself, to be verified to ensure that the data matches the formatting required to be verified by the fraud-detection model (e.g., as identified in a specification of the fraud-detection model). For instance, the routing machine-learning model may determine whether the data has the correct formatting requirement (e.g., the format that matches the request).

If the likelihood of success for the request is lower than a threshold (e.g., when the analytics server determines that the request includes incorrect or incomplete data), the analytics server may reject the request and transmit the request back to the originator along with a message describing the reasons. If the likelihood of success satisfies a threshold, then the analytics server may execute the routing machine-learning model.

The routing machine-learning model may ingest the request, data associated with the request (e.g., transaction information, merchant, customer, products being sold, and the like), data associated with the set of fraud-detection models, and/or any other data associated with the transaction. When executed, the routing machine-learning model may predict a score for at least a subset of the fraud-detection models identified by the analytics server and/or the request.

The score may correspond to the suitability of each fraud-detection model with regard to satisfying the request. Therefore, the score may indicate a likelihood of an accurate result being produced by each fraud-detection model.

The routing machine-learning model may be trained to uncover hidden patterns, such that each score is customized for each request, customer, and/or the merchant. For instance, instead of using static algorithms (used by conventional systems and models), the routing machine-learning model may consider all the data discussed herein, such that the score is customized for the request. For instance, the score may indicate a likelihood of each fraud-detection model producing/predicting a correct response where the score corresponds to the request, transaction data, merchant data, customer data, and/or the like. That is, the same model may ingest the same request; however, one model may be better suited for analyzing the type of the transaction included within the request. Therefore, the latter model may receive a higher score. However, the latter model may receive a lower score for another request involving different attributes and characteristics.

Before executing the routing machine-learning model, the analytics server may first train the routing machine-learning model. The training of the routing machine-learning model is discussed in FIG. 3.

After executing the routing machine-learning model, the analytics server may retrieve a score for each model and may select one or more models based on their respective scores.

In some embodiments, the routing machine-learning model may use a waterfall approach to evaluate each fraud-detection model and generate a score for each service provider. The score for each service provider may correspond to an impact value associated with each fraud-detection model (e.g., the cost associated with each fraud-detection model), a latency value associated with each fraud-detection model (e.g., the latency value at the time of evaluation or a historical latency value), verification timeframe associated with each fraud-detection model, general success rate (historical or a recent success rate), and the like.

The score may also depend on one or more attributes of the data to be verified, such as a data type. Using the training dataset, the routing machine-learning model may identify a relationship between each fraud-detection model's success rate and a verification type or data type of the request. Certain fraud-detection model may have higher success rate for verifying certain types of transactions than other fraud-detection models.

Attributes considered by the fraud-detection model may be derived from historical data or may be derived from recent timeframes. In some embodiments, the determination of whether to use historical or more recent data points to evaluate a service provider may depend on the type of attributes/transaction being evaluated. For instance, regarding latency, the fraud-detection model may use the most recent value, allowing the fraud-detection model to adapt (in real-time or near real-time) if a service provider is having technical issues (affecting their performance) or has a sudden and unexpected latency that deviates from a historical latency trend. In another example, the second computer model may consider a rolling timeframe (e.g., the last month) when evaluating for success rate. Therefore, a spike or sudden drop of the success rate may be ignored by the fraud-detection model, while a spike or sudden drop in latency may be evaluated by the fraud-detection model.

In calculating the score, the fraud-detection model may also consider the attributes of a merchant. The fraud-detection model may have been trained using historical data associated with one or more attributes of a merchant and/or customer.

After generating a score for each fraud-detection model, the analytics server may select the fraud-detection models having a score that satisfies a threshold. Additionally or alternatively, the analytics server may rank the models in accordance with their score and select the top percentage or number of models.

In some embodiments, the user (merchant) may indicate (e.g., in a user profile) an affinity towards a particular fraud-detection model. Additionally, the second computer model may eliminate certain service providers based on whether they have an active status. For instance, certain fraud-detection models may have time or data type restrictions that must be implemented.

After selecting one or more fraud-detection models, the routing machine-learning model may transmit the request (e.g., transaction data, merchant data, customer data, and/or any other data necessary to assess a transaction's likelihood of being fraudulent) to one or more fraud-detection models selected. In some embodiments, a request may be bifurcated and transmitted to multiple fraud-detection models.

At step 240, the analytics server may authorize the transaction. After executing the selected fraud-detection models, the analytics server may receive a fraud-determination. The analytics server may then determine whether to authorize or reject the transaction (as possibly fraudulent) based on the prediction generated by the fraud-detection model. As a result, the analytics server may display the authorization results on a graphical user interface. Additionally or alternatively, the analytics server may (either itself or by instructing a payment server) to deny the transaction and stop any payments related to the transaction. When the transaction is authorized, the analytics server may (either itself or by instructing a payment server) transmit funds to an account of the merchant.

In some embodiments, the analytics server may monitor how various requests are routed to different fraud-detection models. As a result, the analytics server may calibrate the routing machine-learning model accordingly. For instance, the analytics server may generate a feedback loop in which the outcome of the routing and execution of the fraud-detection models are used to improve the routing machine-learning model itself.

Figure 3:
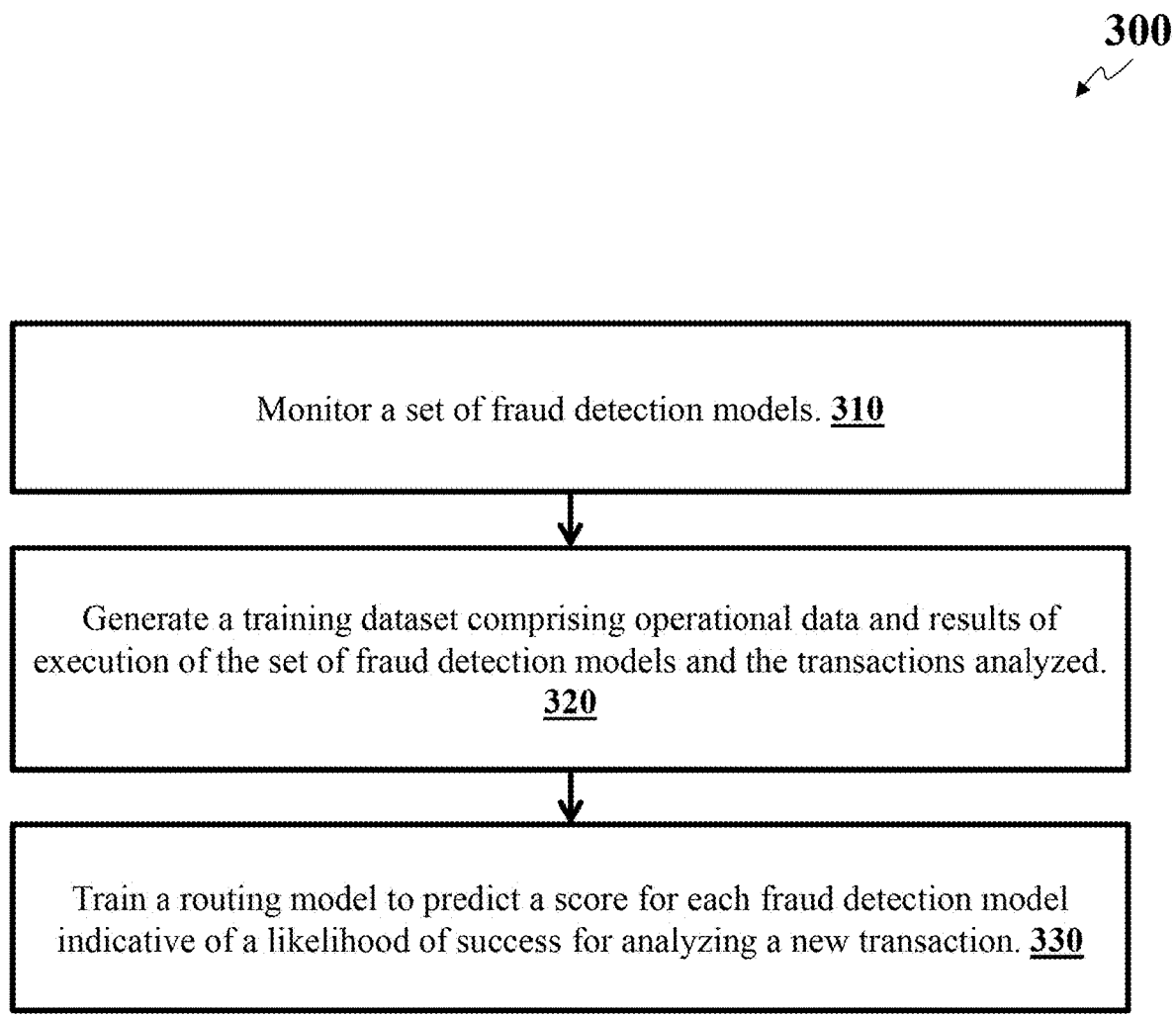
FIG. 3 illustrates a flow diagram of a process executed in an intelligent computer model routing system, according to an embodiment.

Referring now to FIG. 3, a method 300 illustrates a flow diagram of a process executed in an intelligent computer model routing system, according to an embodiment. The method 300 includes steps 310-330. However, other embodiments may include additional or alternative execution steps or may omit one or more steps altogether. The method 300 is described as being executed by a server, similar to the analytics server described in FIG. 1. However, one or more steps of method 300 may also be executed by any number of computing devices operating in the distributed computing system described in FIG. 1.

In some embodiments, the same server or processor (or servers/processors belonging to the same organization) may execute the routing machine-learning model and the fraud-detection models and may also monitor the execution and the results generated to further train the models discussed herein. For instance, the analytics server may execute the method 200 to identify and route requests to one or more suitable fraud-detection models and output the results (e.g., authorize or reject transactions). Moreover, the analytics server may monitor the entire process to train and/or retrain the routing machine-learning model. Alternatively, the analytics server may generate the training dataset and may outsource the training to a different server (e.g., a third-party server).

At step 310, the analytics server may monitor a set of fraud-detection models. As the set of fraud-detection models is executed, they ingest various data points, such as transaction attributes (e.g., transaction amount, fiat currency, type of merchandise, merchant information, and customer information). The set of fraud-detection models may then generate internal values used to determine whether a transaction includes any fraudulent information. As a result, the set of fraud-detection models may then predict a fraud score or likelihood of fraud for the transactions being analyzed. The set of fraud-detection models may then be used in an authorization process where a transaction is ultimately authorized or rejected. As used herein, "operation data" may include all the data that is associated in relation to operation of at least one fraud-detection model.

At step 320, the analytics server may generate a training dataset based on the monitored associated with the authorization process discussed herein, such as at step 310. In another example, the training data may be generated based on the analytics server monitoring data generated/analyzed during execution of the method 200 (e.g., the routing machine-learning model configured to receive a request to verify a transaction and to transmit the request/data to at least one fraud-detection model. The data associated with the authorization process may include any data discussed herein, such as the data ingested, analyzed, and/or predicted by the routing machine-learning model and/or the fraud-detection model. Specifically, the analytics server may record data generated by the analytics server using various methods (e.g., the method 200). In some embodiments, the analytics server may monitor and record data generated while the method 200 is in operation. The recorded data may then be used to improve one or more models discussed herein. That is, the analytics server may generate a feedback loop.

The analytics server may monitor and record historical requests to verify transactions. As discussed herein, the analytics server may monitor and record data associated with the execution of one or more fraud-detection models to determine a fraud score for a transaction. The analytics server may also monitor and collect data associated with execution of the routing machine-learning model itself when selecting one or more suitable fraud-detection models. For instance, the analytics server may monitor and record how the routing machine-learning model generates a score for each fraud-detection computer model. The analytics server may also monitor and record data associated with the routing selection of each request to at least one fraud-detection model to perform the verification.

The analytics server may aggregate the data monitored and collected in order to generate a training dataset. In some embodiments, the analytics server may perform various clean-up protocols to achieve better model training, such as refining the aggregated data. For instance, the analytics server may de-duplicate various data points, change various frequencies to achieve more uniform data distribution, and/ or aggregate or eliminate outliers or data records.

At step 330, the analytics server may train a routing machine-learning model, wherein the trained routing machine-learning model is configured to receive a new request for verification of a new transaction and predict a score associated with at least one fraud-detection model.

The analytics server may use various training methods, such as a supervised, unsupervised, and/or semi-supervised training. In some embodiments, using a supervised method, the analytics server may label the training dataset where the ultimate outcome (e.g., likelihood of fraud and/or selection of a particular fraud-detection model) is labeled as the ground truth. Using the ground-truth training dataset, the analytics server may train itself and then identify hidden patterns within the data and determine how the data records within the training dataset can be used to predict the ultimate outcome.

Additionally or alternatively, the analytics server may use an unsupervised method where the training dataset is not labeled as the ground truth. Because labeling the data within the training dataset may be time-consuming and may require substantial computing power, the analytics server may utilize unsupervised training techniques to train the machine-learning model.

After training is completed (during the inference phase), the routing machine-learning model may be configured to receive a new request to verify a new transaction and use its training (via historical requests and how they were routed) to predict a suitable fraud-detection model. Specifically, the routing machine-leaning model may be configured to generate a score for one or more fraud-detection models.

The routing machine-learning computer model may be a machine-learning model that has been trained using a training dataset comprising previous transactions analyzed by various fraud-detection models. The training dataset may include an outcome of the verification by a fraud-detection model and whether the outcome was correct. Additionally, the training dataset may include attributes associated with each fraud-detection model (e.g., numerical representations of strengths and weaknesses in the performance of each service provider). Certain operational parameters may also be included within the training dataset. For instance, each fraud-detection model may require a certain degree of computing power for the decision-making process; each fraud-detection model may also include accuracy, precision, and/or recall metrics, such as area under curve (AUC) and the like. These metrics may also be included within the training data. Certain fraud-detection models may belong to third-party entities where each API call may have a financial cost for the analytics server (e.g., an amount of money per execution). This information can also be included within the training dataset. Other data associated with the fraud-detection models may include computational power, memory capacity, processing speed, graphics capabilities, latency, compatibility with the desired software or applications, intended use, budget constraints, scalability requirements, future-proofing, and the like.

Using the methods and systems discussed herein, performance of one or more sub-models can also be improved. This can be mainly because the sub-models receive and analyze data that they are configured to (and known to) analyze better than other sub-models.

In a non-limiting example, a single suite of artificial intelligence models may include multiple sub-models. For instance a global fraud-detection model may be used where the global fraud-detection model includes various sub-models where the sub-models are calibrated for different characteristics. For instance, a group of sub-models may be configured for different categories of products/services associated with the transaction (e.g., software, food and drink, merchandise, and clothing). Another group of sub-models may be configured for different geographical location associated with the merchant (e.g., physical store, card not present transactions, Latin America, United States, and the like).

The analytics server may then receive a request to generate a fraud status for a transaction conducted. The analytics server first queries and retrieves data associated with the transaction. For instance, the analytics server determines that the transaction was a card-not-present transaction from a luxury clothing store selling shoes, the transaction was conducted in Brazil but using an American credit card, and the transaction amount was $860). Using the data retrieved, the analytics server may execute the routing machine-learning model where a score for each sub-model is generated. The analytics server may then select the top three sub-models (e.g., American (not Latin American) transaction sub-model, Luxury clothing products sub-model, and card-not-present sub-model). The analytics server may then execute the selected models where a fraud score is generated for the transaction. The analytics server then determines that the fraud score is below a threshold. As a result, the analytics server rejects the transaction.

As discussed herein, using the methods and systems discussed herein can improve the overall results and can improve performance of the models discussed herein. Various metrics can also be displayed for a system administrator to monitor. Referring now to FIGS. 4-7, a non-limiting examples of implementation of the methods and systems discussed herein are illustrated. The using the visualization methods discussed herein, the analytics server may visually illustrate performance of one or more models/sub-models, such that a viewer can easily gauge and compare performance of different models, affected customers, and the like. FIGS. 4-7 discuss AUC and recall metrics, which can be used to analyze model performance. However, it is expressly understood that these visualization can be used for any other metric that can gauge a machine-learning model's performance.

In one embodiment, the analytics server may use AUC to provide a comparison between different models. As used herein, AUC is a metric in machine-learning that is used to evaluate and compare the performance of one or more models. Specifically, AUC generally represents the measure of the entire two-dimensional area underneath the receiver operating characteristic (ROC) curve, which illustrates the trade-off between the true positive rate (sensitivity) and the false positive rate (1-specificity) for different classification thresholds. Using the AUC, one can gauge a model's ability to discriminate between positive and negative instances across various threshold settings. Comparing AUC of different models may indicate which model performs better.

In another embodiment, the analytics server may use recall to provide a comparison between different models.

Recall, as used herein, may refer to the metric that addresses the issue of imbalanced datasets, where the number of instances in one class significantly outweighs the other. This bias can be overcome by emphasizing the recall (also known as true positive rate or sensitivity) of the minority class. In some embodiments, models achieve this by applying a smoothing function that assigns higher weights to the minority class during model training, effectively increasing their influence on the learning process.

In FIG. 4, a chart 400 indicates different merchant users and how their overall transaction authorization has been affected using the routing machine-learning model discussed herein using different sub-models. In some embodiments, the impact to each model may also be measured using various machine-learning metrics, such as AUC and/or recall. The chart 400 may also include an AUC impact represented in a numerical or absolute manner. A column 402 within the chart 400 may indicate different sub-models. Each sub-model may be calibrated for different items being sold (or otherwise associated with a transaction). For instance, one sub-model may be calibrated to identify fraud in transactions that involve food and drinks, software products, clothing items, and/or other merchandise. Each sub-model may have a corresponding recall impact value, as indicated in a column 404. The recall impact value may compare the recall value of each sub-model before implementing the methods and systems discussed herein and the recall value for the same sub-model after implementing the methods (of model routing) discussed herein. In this way, the viewer may determine how using the intelligent routing methods discussed herein has affected each sub-model. For instance, the software sub-model may have a positive recall impact while the clothing model may have a negative recall impact.

The chart 400 may also identify merchants who use various sub-models and how they have been impacted. For instance, a column 406 may identify merchants who use a particular sub-model and have been positively impacted by using the intelligent routing methods discussed herein. For instance, merchant A has been positively impacted (e.g., has had more fraudulent transaction identified) when using the software sub-model. A column 408 may indicate merchants who have been negatively impacted. For instance, merchant H (who uses the clothing sub-model) has been negatively impacted. Using the chart 400, the viewer may easily identify which merchants have been positively and negatively impacted and which sub-models are responsible for the impact.

Each sub-model may also have a corresponding AUC impact value, as indicated in a column 410. The AUC impact value may compare the AUC value of each sub-model before implementing the methods and systems discussed herein and the AUC value for the same sub-model after implementing the methods (of model routing) discussed herein. In this way, the viewer may determine how using the intelligent routing methods discussed herein has affected each sub-model. For instance, the software sub-model may have a positive AUC impact.

The chart 400 illustrates the existence of a strong directional signal for using transfer learning as an ML customization.

In some embodiments, the analytics server may illustrate detailed statistical analysis comparing different models and/or sub-models. For instance, as depicted in FIG. 5, a chart 500 compares two sub-models (e.g., food and drink sub-model and the merchandise sub-model, as indicated in a column 502). A column 504 illustrates a standard deviation value of the recall metric for each sub-model, which is a measure of dispersion of the recall values. A column 506 indicates the standard deviation of AUC for different sub-models. The chart 500 may also depict standard mean values for recall and AUC (columns 508 and 510). These values can be used to gauge model performance. For instance, a model may be compared to various internal thresholds (with respect to recall and/or AUC). When a model does not satisfy the threshold, a notification may be transmitted to a system administrator identifying the model's performance. In some embodiments, a historical trend of recall or AUC values may indicate whether the model's performance is improving.

In some embodiments, the routing machine-learning model may dynamically adjust its routing accordingly. For instance, the routing machine learning model may consider whether a model's performance satisfies a threshold and may revise routing requests to that model. In this way, the routing machine learning model may route requests to a more suitable (in this case more accurate) model.

Figure 6:
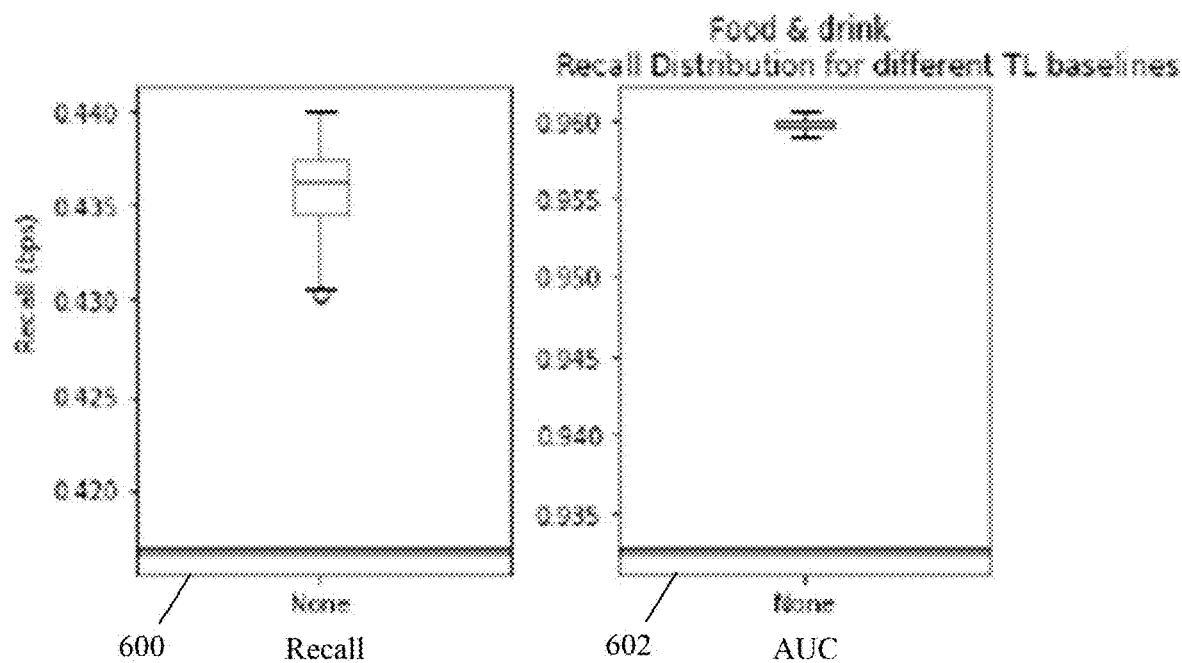
Figure 7:
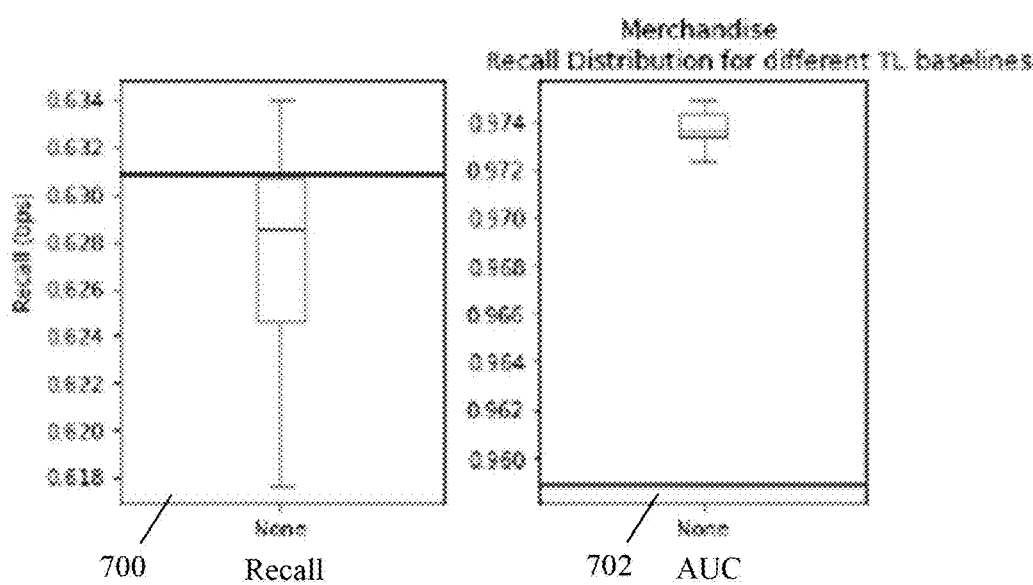

As illustrated in FIG. 6, results for food and drink sub-models (numerically represented in FIGS. 4-5) can also be shown as box plots. For instance, as illustrated in a chart 600, recall values for the food and drink sub-model have more variance with a standard deviation of 22 bps (illustrated in FIG. 5). Moreover, as illustrated in the chart 602 the AUC values for the same sub-model has less variance (4 bps illustrated in FIG. 5). Similarly, the same visualization paradigm can be used for the merchandise model, as illustrated in FIG. 7 where a chart 700 illustrates the recall values and the chart 702 illustrates the AUC values of the merchandise sub-model.

The machine-learning-specific metrics (accuracy metrics), such as AUC and recall, can also be displayed using visual aids, as depicted in FIGS. 5-6. Additionally or alternatively, accuracy metrics can be shown for different sub-models, as depicted in FIG. 7.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method of reducing latency in execution of a set of fraud-detection models to authorize or reject a potential network operation, the method comprising:
   identifying, by a processor, the set of fraud-detection models to be used to determine a fraud status of the potential network operation;
   executing, by the processor, a routing machine-learning model configured to generate a score for at least a subset of the set of fraud-detection models, based on an input of an amount and an attribute associated with the potential network operation, the score indicative of the fraud status for the potential network operation based on the amount and the attribute, wherein the routing machine-learning model has been previously trained using a training dataset comprising prior fraud status detection data and latency data for each fraud-detection machine-learning model;
   routing, by the processor, data associated with the potential network operation to the subset of the set of fraud-detection models to reduce a latency of execution of the set of fraud-detection models, wherein the routing is selected at least in part in accordance with a latency value of each fraud-detection model's respective score;
   executing, by the processor using the amount and the attribute associated with the potential network operation, the subset of the set of fraud-detection models selected in accordance with each fraud-detection model's respective score, whereby at least one fraud-detection model within the subset of the set of fraud-detection models generates a prediction associated with the fraud status of the potential network operation;
   when the prediction satisfies a threshold, authorizing, by the processor, the potential network operation based on the prediction; and
   when the prediction does not satisfy the threshold, denying, by the processor, the potential network operation.

2. The method of claim 1, wherein the attribute corresponds to a category of a product or service associated with the potential network operation.

3. The method of claim 1, wherein the attribute corresponds to an attribute of a merchant associated with the potential network operation.

4. The method of claim 1, wherein the routing machine-learning model is further trained in accordance with at least one merchant preference.

5. The method of claim 1, wherein the routing machine-learning model is further trained in accordance with a geographical attribute of the potential network operation.

6. The method of claim 1, further comprising:
   training, by the processor, the routing machine-learning model in accordance with the prediction associated with the fraud status of the potential network operation.

7. The method of claim 1, further comprising:
   displaying, by the processor, at least one metric associated with at least one fraud-detection model.

8. A non-transitory machine-readable storage medium having computer-executable instructions stored thereon that, when executed by one or more processors, cause the one or more processors to perform operations for reducing latency in execution of a set of fraud-detection models to authorize or reject a potential network operation, the operations comprising:
   identify the set of fraud-detection models to be used to determine a fraud status of the potential network operation;
   execute a routing machine-learning model configured to generate a score for at least a subset of the set of fraud-detection models, based on an input of an amount and an attribute associated with the potential network operation, the score indicative of the fraud status for the potential network operation based on the amount and the attribute, wherein the routing machine-learning model has been previously trained using a training dataset comprising prior fraud status detection data and latency data for each fraud-detection machine-learning model;

route data associated with the potential network operation to the subset of the set of fraud-detection models to reduce a latency of execution of the set of fraud-detection models, wherein the routing is selected at least in part in accordance with a latency value of each fraud-detection model's respective score;

execute, using the amount and the attribute associated with the potential network operation, the subset of the set of fraud-detection models selected in accordance with each fraud-detection model's respective score, whereby at least one fraud-detection model within the subset of the set of fraud-detection models generates a prediction associated with the fraud status of the potential network operation;

when the prediction satisfies a threshold, authorize the potential network operation based on the prediction; and when the prediction does not satisfy the threshold, deny the potential network operation.

9. The non-transitory machine-readable storage medium of claim 8, wherein the attribute corresponds to a category of a product or service associated with the potential network operation.

10. The non-transitory machine-readable storage medium of claim 8, wherein the attribute corresponds to an attribute of a merchant associated with the potential network operation.

11. The non-transitory machine-readable storage medium of claim 8, wherein the routing machine-learning model is further trained in accordance with at least one merchant preference.

12. The non-transitory machine-readable storage medium of claim 8, wherein the routing machine-learning model is further trained in accordance with a geographical attribute of the potential network operation.

13. The non-transitory machine-readable storage medium of claim 8, wherein the computer-executable instructions are further configured to cause the one or more processors to:
train the routing machine-learning model in accordance with the prediction associated with the fraud status of the potential network operation.

14. The non-transitory machine-readable storage medium of claim 8, wherein the computer-executable instructions are further configured to cause the one or more processors to:
display at least one metric associated with at least one fraud-detection model.

15. A system for reducing latency in execution of a set of fraud-detection models to authorize or reject a potential network operation, comprising a processor configured to:
identify the set of fraud-detection models to be used to determine a fraud status of a potential network operation;

execute a routing machine-learning model configured to generate a score for at least a subset of the set of fraud-detection models, based on an input of an amount and an attribute associated with the potential network operation, the score indicative of the fraud status for the potential network operation based on the amount and the attribute, wherein the routing machine-learning model has been previously trained using a training dataset comprising prior fraud status detection data and latency data for each fraud-detection machine-learning model;

route data associated with the potential network operation to the subset of the set of fraud-detection models to reduce a latency of execution of the set of fraud-detection models, wherein the routing is selected at least in part in accordance with a latency value of each fraud-detection model's respective score;

execute, using the amount and the attribute associated with the potential network operation, the subset of the set of fraud-detection models selected in accordance with each fraud-detection model's respective score, whereby at least one fraud-detection model within the subset of the set of fraud-detection models generates a prediction associated with the fraud status of the potential network operation;

when the prediction satisfies a threshold, authorize the potential network operation based on the prediction; and when the prediction does not satisfy the threshold, deny the potential network operation.

16. The system of claim 15, wherein the attribute corresponds to a category of a product or service associated with the potential network operation.

17. The system of claim 15, wherein the attribute corresponds to an attribute of a merchant associated with the potential network operation.

18. The system of claim 15, wherein the routing machine-learning model is further trained in accordance with at least one merchant preference.

19. The system of claim 15, wherein the routing machine-learning model is further trained in accordance with a geographical attribute of the potential network operation.

20. The system of claim 15, wherein the processor is further configured to:
train the routing machine-learning model in accordance with the prediction associated with the fraud status of the potential network operation.

\* \* \* \* \*